(No Model.)
J. FORSYTHE.
ROTARY STEAM ENGINE.
No. 335,121. Patented Feb. 2, 1886.
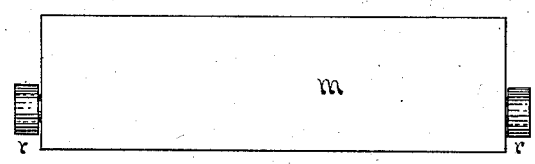
Fig. 5
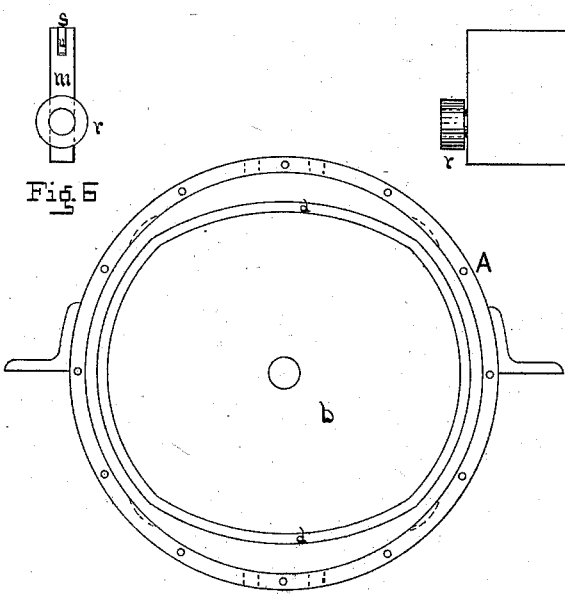
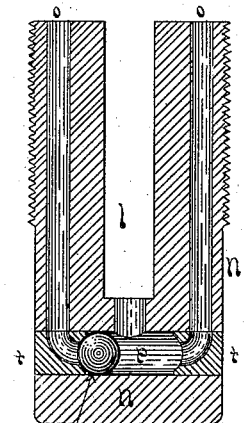
Fig. 4
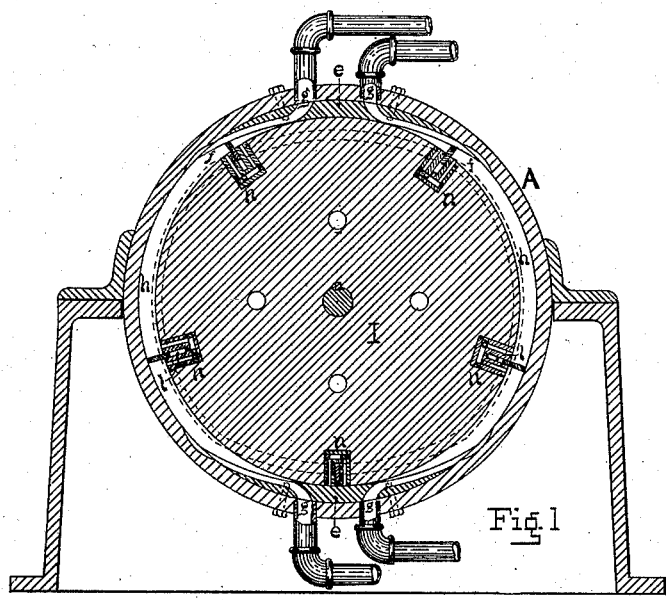
Fig. 1
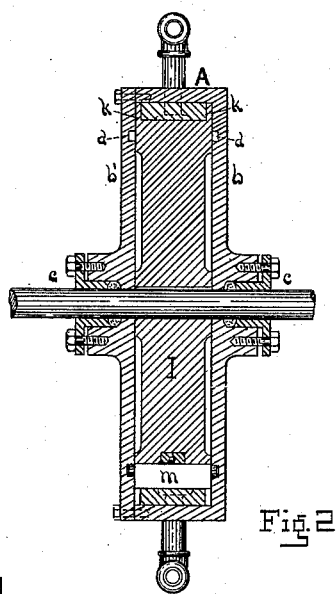
Fig. 2
Witnesses
O P Robertson
Selwyn Taylor
Inventor
Joseph Forsythe

UNITED STATES PATENT OFFICE.

JOSEPH FORSYTHE, OF PITTSBURG, PENNSYLVANIA.

ROTARY STEAM-ENGINE.

SPECIFICATION forming part of Letters Patent No. 335,121, dated February 2, 1886.

Application filed November 9, 1885. Serial No. 182,301. (No model.)

*To all whom it may concern:*

Be it known that I, JOSEPH FORSYTHE, a citizen of the United States, residing in the city of Pittsburg, county of Allegheny, and State of Pennsylvania, have invented certain new and useful Improvements in Rotary Engines, of which the following is a description, reference being had to the accompanying drawings, which form part of this specification, wherein—

Figure 1 represents a vertical section at medial line transverse to axis; Fig. 2, a vertical section at medial line parallel with axis; Fig. 3, a view of interior of the cylinder with the piston out, allowing one of the curved grooves to be seen in inner side of head; Fig. 4, a section of the valve-plug; Figs. 5 and 6, lateral and end views of the valve.

Similar letters refer to similar parts throughout the several views.

My engine consists of a cylindrical shell, A, integral with one of its heads, b, the other head, b', made separate and bolted on, each having at its center a proper stuffing-box, c, for shaft of piston.

Exactly opposite each other in the inner sides of the heads b and b', and corresponding in position to the course to be traveled by the moving piston-heads or valves are two endless curved grooves, d—one in each cylinder-head—generating an ellipse or double eccentric, having its shorter radii between the fixed abutments e of the cylinder and the axis of the piston.

Attached to or set in the shell of the cylinder A, and projecting inwardly from its concave surface, are two abutments or fixed heads, e, sufficiently separated from the cylinder-heads b and b' to allow the intervention of the flanges k of the piston, each abutment provided at each end with an incline, f, and ways g, which ways may be used alternately as influent and effluent ways to and from the valve-circle k, being controlled by suitable stop-cocks. The piston I is a solid cylinder of smaller diameter than the space in the hollow cylinder A, its body fitting neatly between the abutments e and heads b and b' of the cylinder, its flanges k between the abutments e and heads b and b', extending out to the concave surface of the cylinder, both the flanges and body being cut transversely at equal distances to form five radial valve-recesses, l, in the body of the piston, with radial grooves in the flanges in front of each, to guide and support the plate-valves m when in motion or under pressure, each recess being cut partly through a plug, n, first inserted, so that one of the conduits o (shown in Fig. 4) is on each side of the valve-recess, said conduits o being connected at the inner end by a larger conduit, p, at right angles, which has a port into the rear of the valve-recess l, and contains a ball-valve, q, which, when pressed from one side, closes the port of the conduit o on the other side, passing over the port into the valve-recess, and allowing the steam on that side from which the pressure comes free passage to and from the valve-recess. The valve-recesses are provided with rectangular plate-valves m, having at each end short arms carrying anti-friction wheels or rollers designed to move in the curved or elliptical grooves d in the cylinder-heads. These valves m have in the edges intended to move against the concave surface of the cylinder a small groove, s, for a strip of sheet iron or steel packing, u, held by screws in lengthened holes, which permit the bow-spring placed behind to drive it out as far as may be necessary for packing.

Although I have described this engine as constructed with flanges and spaces between the abutments and heads for them, it may be modified by dispensing with the flanges k, extending the abutments e from head b to head b', deepening the valve-recesses l, and proportionably increasing the radial dimensions of the valves m to replace the support taken away with the flanges by giving them fulcrums and making levers of them. And although I have described this engine as reversible or adapted to move alternately in opposite directions, it may be modified for motion in one direction only by leaving out the plug n, with its conduits o and p and ball-valve q, and placing instead in the wall of valve-recess, at the medial line on that side of the valve intended to receive the impulse, a radial groove reaching to the depth of the space behind the valve. The valve m also may be modified by leaving out the bow-spring and introducing steam behind the packing through an orifice in the side of the valve. And although I have described this engine with the grooves d in the inner sides of its cylinder-heads so curved as to secure the revolution of the valves in an elliptic or double-eccentric orbit or course, with two fixed abutments as concomitants, it may be modified by so curving the grooves as to make the orbit or course of the valves eccentric and using one fixed abutment as concomitant or otherwise by so curving the grooves as to make the orbit or course of the valves polyeccentric, and using a number of abutments equal to the deviations from the geometrical center.

The mode of operation of this engine will be as follows: All the valves being guided and held laterally by the walls of their recesses and the grooves in the flanges of the piston, and radially by the curved grooves wherein the rollers move, steam admitted by the influent way to the valve-circle in front of the fixed abutments described finds always before it to obstruct its expansion or escape a valve, and, driving that valve before it, forces the piston, with all its other valves, into revolution, whereby the rollers of the following valves are made to roll successively up the inclines of the ellipse formed by the curved grooves, lifting the valves from their recesses to the valve-circle in front of the fixed abutment, to obstruct in like manner the expansion and escape of the steam following, and when their work is done, and they have been relieved of pressure by the escape of the steam through the effluent ways, are on their rollers borne down the inclines of the ellipse into the depths of the valve-recesses, to pass under the fixed abutments, thence to emerge again and to be operated again in the manner aforesaid. The steam admitted by the conduits $o$ on one side of the valve drives the ball $q$ against the ports of the conduits $o$ on the other side, sealing them and preventing the escape of the steam, which, freely admitted to the valve-recesses behind the valves, counterbalances the pressure on the outer edges of the valves, assists in lifting the valves, diminishing the friction of their ascent up the inclines of the curved grooves, and finally exhausts back the way it came to the valve-circle, when the revolution of the piston carries the inter-valve spaces opposite the exhaust-ports at the backs of the abutments, the motion being reversed by turning a stop-cock controlling both ways and shutting one as influent and opening it as effluent, and opening the other as influent and closing it as an effluent way.

I claim as my invention—

In a rotary steam-engine, a stationary cylinder provided with two endless curved grooves in the inner sides of its heads exactly opposite each other, and one or more fixed abutments projecting inwardly from its concave surface opposite the shorter radius or radii of said curved grooves, each abutment having inclines and influent and effluent ways, in combination with a rotating piston having three or more radial valve-recesses, each provided with a plate-valve having short arms with anti-friction rollers, and an auxiliary ball-valve, so arranged that steam admitted pressing on one side of said plate-valves starts the piston into revolution, carrying all the other valves with it, and the plate-valves on their rollers are successively borne up the inclines of said curved grooves to the front of said fixed abutments, along the levels and down the other inclines of said grooves, to pass under said fixed abutments, thence to emerge in the manner aforesaid.

In witness whereof I hereto sign my name.

JOSEPH FORSYTHE.

Witnesses:
O. P. ROBERTSON,
SELWYN TAYLOR.